Patented Mar. 20, 1945

2,372,119

UNITED STATES PATENT OFFICE 2,372,119

PROCESS OF MAKING THIOCYANATES

George Riethof, Mount Lebanon, Pa., assignor to Pittsburgh Coke & Iron Company, Pittsburgh, Pa., a corporation of Pennsylvania No Drawing. Application December 4, 1943, Serial No. 512,969

6 Claims. (Cl. 23—75)

The present invention relates to the manufacture of thiocyanates, and particularly alkali metal thiocyanates, such as those of sodium and potassium.

The primary object of the invention is to form thiocyanates by the reaction of a soluble cyanide with sulphur in the presence of a solvent for sulphur, such as ammonium and alkali metal sulphides.

Another and equally important object of the invention is to carry out the reaction using an amount of sulphide which is less than the equi-molecular amount of alkali metal cyanide.

I have discovered that alkali metal thiocyanates can be produced by the reaction of sulphur with a soluble cyanide in the presence of a sulphide which is a solvent for the sulphur and in a manner which is equally as efficient as the well-known reaction between a soluble polysulphide, such as ammonium polysulphide, and a soluble cyanide to produce ammonium thiocyanate. The latter process is used on a large scale and presents no difficulties since the ammonia, hydrogen sulphide and hydrocyanic acid formed are easily removable. However, when it was attempted to follow the same procedure with alkali metal polysulphides, difficulties arose in removing the sulphide produced. For instance, in the production of sodium thiocyanate by the known procedure, an equivalent amount of sodium sulphide always remained in solution according to the equation: $Na_2S_2 + NaCN = NaCNS + Na_2S$. The solution contained 96 grams of $Na_2S$ for each 100 grams of sodium thiocyanate produced. This condition remained notwithstanding the use of the highest polysulphide, for according to the reaction: $Na_2S_5 + 4NaCN = 4NaCNS + Na_2S$ there was obtained 24 grams of sodium sulphide for each 100 grams of sodium thiocyanate. In other words, equi-molecular proportions of the alkali metal cyanide and the sulphide were required and upon completion of the reaction it was found that such a large amount of sulphide produced remained in the solution that it could be removed only with difficulty. This made the process inefficient and commercially unattractive.

According to the present invention, alkali metal and ammonium sulphides are employed to dissolve the sulphur for reaction with the soluble cyanide, and in substantially less than equi-molecular amount with respect to the cyanide.

The cyanide in aqueous solution is added slowly to the aqueous solution of sulphide containing dissolved sulphur whereby the cyanide reacts with the sulphur in solution. The reaction is carried out initially at room temperature and as the reaction proceeds, the temperature rises but when the dilution becomes greater than the heat of reaction, which is exothermic, is not sufficient to promote enough rapid reaction. Therefore, some heat has to be applied but care must be taken that the temperature is maintained below the point at which sulphur becomes plastic or lumps. The maximum temperature is in the neighborhood of 100° C. This addition is made continuously in amount sufficient for the cyanide to react with the sulphur, which is continuously dissolved as the reaction continues until all of the cyanide has been converted to the thiocyanate. The alkali metal and ammonium sulphides dissolve sulphur in exceedingly dilute solutions at elevated temperatures, and only a relatively small amount of sulphide is necessary, i. e., substantially less than equimolecular proportions based on the amount of soluble cyanide in order to convert a large amount of sodium cyanide into sodium thiocyanate.

Thus, in one experiment the ratio of ammonium sulphide to sulphur was 1:140. This means that only 6 grams of ammonium sulphide, or 7 grams of sodium sulphide, were necessary to produce 1000 grams of sodium thiocyanate. Such small amount of ammonium or alkali sulphide used is economically of no importance and can be boiled off in the case of ammonium sulphide or converted to alkali carbonate by means of $CO_2$ in the case of alkali sulphide. In the production of sodium thiocyanate the sodium carbonate formed is only slightly soluble in concentrated sodium thiocyanate solutions and can therefore be removed by filtration.

Example 400 grams of technical sulphur, for instance as purchased for the production of sulphuric acid, are ground to less than 20 mesh and put in a 3 liter flask fitted with an air condenser. To this is added 100 cc. of an aqueous solution containing approximately 20% ammonium sulphide. This is a molecular ratio of ammonium sulphide to sulphur of 1:42. To this mixture is added slowly and with agitation about 1700 cc. of an aqueous solution of approximately 30% sodium cyanide. Care should be taken that sulphur is always in solution as can be readily determined by the color of the solution, and also that the temperature does not become too high thereby causing loss of ammonium sulphide or lumping of the sulphur. When about half of the sodium cyanide solution has been added, the flask is heated to a maximum of 90° C. and the addition of the cyanide solution is continued. After all the sulphur has gone into solution, a slight excess of sodium cyanide is added to react with and thereby remove all dissolved sulphur, the air condenser is removed and $CO_2$ at elevated temperature is bubbled through the solution, which is kept constantly boiling until all hydrogen sulphide is removed and any excess of sodium cyanide is converted into sodium carbonate. At the same time the solution becomes concentrated with respect to sodium thiocyanate, and this concentrating is usually carried on after the hydrogen sulphide and hydrocyanic acid is removed and until the boiling point of the solution reaches 135° C. This solution is saturated with sodium thiocyanate at room temperature and most of the sodium carbonate which may have been formed by treatment of the solution with $CO_2$ separates. As hot concentrated solutions of sodium thiocyanates destroy filter paper, the solution is cooled below 100° C. and then filtered from the impurities of the sulphur and the precipitated sodium carbonate.

For the production of sodium thiocyanate crystals the filtrate is evaporated further preferably to a boiling point of 145–150° C. and the crystals are recovered in the usual way.

A substantially similar procedure is employed for making other alkali metal thiocyanates e. g. of potassium.

In the foregoing example, sodium sulphide may be employed in lieu of ammonium sulphide for the manufacture of sodium thiocyanate. Likewise, potassium sulphide may be used in lieu of ammonium sulphide together with potassium cyanide for the manufacture of potassium thiocyanate.

By the expression "the amount of the sulphide present being less than an equi-molecular amount of the cyanide," in the claims, I mean that for every four molecular weights of sodium cyanide using sodium sulphide, or five molecular weights of potassium cyanide using potassium sulphide, or eight molecular weights of alkali metal cyanide using ammonium sulphide, there is present less than one molecular weight of ammonium or alkali metal sulphide. In other words, the total amount of cyanide reacted is appreciably in excess of the polysulfide present, whereby large amounts of thiocyanate are formed with an amount of polysulfide which is less than an equimolecular amount of the cyanide. Of course, the molecular ratio of sulphur to cyanide must be at least 01:1.

I claim:

1. The method of preparing alkali metal thiocyanates which comprises adding sulphur to an aqueous solution of sulphide selected from the group consisting of ammonium and alkali metal sulphides which dissolve sulphur and form polysulphides, reacting the polysulphides with successive increments of an aqueous solution of an alkali metal cyanide, the total amount of cyanide so reacted being appreciably in excess of the polysulphide present, whereby large amounts of thiocyanate are formed with an amount of polysulphide which is less than an equimolecular amount of the cyanide.

2. The process in accordance with claim 1, wherein the sulphide is ammonium sulphide.

3. The process in accordance with claim 1, wherein the sulphide is an alkali metal sulphide.

4. The process in accordance with claim 1, wherein the sulphur is added to an aqueous solution of the sulphide and thereafter the cyanide is slowly added to react with the sulphur which is in solution in the sulphide until the reaction is completed.

5. The process in accordance with claim 1, wherein the reaction is carried out at temperatures below the temperature at which sulphur becomes plastic.

6. The process according to claim 1, in which the reaction is carried out at temperatures up to about 100° C.

GEORGE RIETHOF.